(12) United States Patent
Raghothaman

(10) Patent No.: US 8,452,299 B2
(45) Date of Patent: May 28, 2013

(54) ALLOCATING CODE SPACE TO BASE STATIONS

(75) Inventor: Balaji Raghothaman, Hollis, NH (US)

(73) Assignee: Airvana LLC, Chelmsford, MA (US)

( * ) Notice: Subject to any disclaimer, the term of this patent is extended or adjusted under 35 U.S.C. 154(b) by 1182 days.

(21) Appl. No.: 11/962,983

(22) Filed: Dec. 21, 2007

(65) Prior Publication Data

US 2009/0186626 A1 Jul. 23, 2009

(51) Int. Cl.
*H04W 74/00* (2009.01)
(52) U.S. Cl.
USPC .......................... 455/452.2; 455/123
(58) Field of Classification Search
USPC ............................... 455/123, 452.2
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,731,941 B2 * | 5/2004 | Kim | 455/456.2 |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,558,356 B2 | 7/2009 | Pollman et al. | |
| 7,558,588 B2 | 7/2009 | To et al. | |
| 2002/0196749 A1 | 12/2002 | Eyuboglu et al. | |
| 2003/0100311 A1 | 5/2003 | Chung et al. | |
| 2005/0138671 A1 * | 6/2005 | Love et al. | 725/123 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |

(Continued)

FOREIGN PATENT DOCUMENTS

GB 2452688 3/2009

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner* — Amancio Gonzalez
(74) *Attorney, Agent, or Firm* — Fish & Richardson, P.C.

(57) ABSTRACT

In addition to other aspects disclosed, a portable base station requests a mobile handset to measure signal strengths associated with a portion of a code space. The portable base station also sends a message that represents the signal strength measurements to a remotely located control station.

25 Claims, 6 Drawing Sheets

U.S. PATENT DOCUMENTS

| | | |
|---|---|---|
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0107215 A1* | 5/2008 | Nibe ............ 375/346 |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0205342 A1* | 8/2008 | Radhakrishnan et al. .... 370/331 |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'Ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2009/0186626 A1 | 7/2009 | Raghothaman et al. |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

3rd Generation Partnership Project 2 "3GPP2", "cdma2000 1X Layer 3 Specification", C.S0005-A, version 5, Jul. 2001 (1696 pages).

3rd Generation Partnership Project 2 "3GPP2", "cdma2000 1X Layer 3 Specification", C.S0005-A, version 6, Addendum A, Feb. 2002 (1664 pages).

* cited by examiner

| PN Offset | Signal Strength |
|---|---|
| 4 | -77 dB |
| 2 | -75 dB |
| 1 | -85 dB |
| 3 | -30 dB |
| 5 | -20 dB |
| 6 | -25 dB |
| 7 | -35 dB |

List of PN Measurements

FIG. 5

ALLOCATING CODE SPACE TO BASE STATIONS

BACKGROUND

This disclosure relates to using base stations to detect and assign available code space.

Cellular wireless communication systems may be designed to serve many mobile handsets. One technique for sharing wireless communications bandwidth is code-division multiple access (CDMA), in which bandwidth may be divided by incorporating portions of a code space into communication signals of a cellular system. By assigning different timing offsets of the code to transmission base stations of the system, multiple wireless signals may coexist in space, time, and frequency without substantially interfering with one another. The code space portions and associated timing offsets used by the base stations are typically assigned during system development based upon an overall cellular network design.

SUMMARY

In general, in some aspects of the disclosure, a portable base station, requests a mobile handset to measure signal strengths associated with a portion of a code space. The portable base station also sends a message that represents the signal strength measurements to a remotely located control station.

A portion of the code space for use by the portable base station may be selected, based at least in part upon the measurements of signal strength. The request for signal strength measurement may include identifying a portion of code space in which to measure signal strength. The identified portion of code space may be selected based upon the geographic location of the portable base station. The code space may include one or more sequences of pseudorandom numbers and associated timing offsets. The portable base station may receive a message from the control station that identifies a portion of code space assigned to the portable base station.

In some aspects of the disclosure, an apparatus includes a portable base station that is configured to request a mobile handset to measure signal strengths associated with a portion of a code space. The portable base station is also configured to send a message that represents the signal strength measurements to a remotely located control station.

The portable base station may also be configured to select a portion of the code space for use by the portable base station, based at least in part upon the measurements of signal strength. The portable base station may also be configured identify a portion of code space in which to request measurements of signal strength. The identified portion of code space may be selected based upon the geographic location of the portable base station. The code space may include one or more sequences of pseudorandom numbers and associated timing offsets. The portable base station may also be configured to receive a message that identifies a portion of the code space assigned to the portable base station from the control station.

In some aspects of the disclosure, a system includes a portable base station configured to request a mobile handset to measure signal strength associated with elements of a code space. The portable base station is also configured to send a message that represents received signal strength measurements. The system also includes a control station configured to assign a portion of the code space to the portable base station based in part upon said signal strength measurements.

The portable base station may also be configured to select, based at least in part upon geographic location of the portable base station, a portion of code space in which to request measurements of signal strength. The code space may include one or more sequences of pseudorandom numbers and associated timing offsets. The portable base station may also be configured to calculate a weighted average of signal strength measurements from multiple mobile handsets for one or more code space elements.

In some aspects of the disclosure, a computer readable medium stores instructions that are executable by a processing device, and upon such execution cause the processing device to send a request to measure signal strengths associated with a portion of a code space from a portable base station to a mobile handset. The medium also stores instructions to cause the processing device to send a message that represents the signal strength measurements to a remotely located control station from the portable base station.

The instructions may cause the processing device to select a portion of the code space for use by the portable base station, based at least in part upon the measurements of signal strength. The instructions may cause the processing device to identify a portion of code space in which to measure signal strength. The identified portion of code space may be selected based upon the geographic location of the portable base station. The code space may include one or more sequences of pseudorandom numbers and associated timing offsets. The instructions may also cause the processing device to receive a message at the portable base station that identifies a portion of code space assigned to the portable base station from the control station.

In some aspects of the disclosure, an apparatus includes a portable antenna configured to transmit and receive electromagnetic signals. The apparatus also includes a portable base station connected to the portable antenna. The portable base station includes a radio node configured to control the portable antenna and to comply with at least one wireless communication protocol. The portable base station also includes a radio node controller configured to provide transmission signals to the radio node and receive signals from the radio node to establish a connection between the portable base station and a mobile handset. The radio node controller is also configured to request the mobile handset measure signal strength associated with a portion of a code space. The portable base station also includes an access gateway for exchanging data packets with a network. The access gateway is configured to send a message that represents the measured signal strength to a remotely located control station.

The portable base station may send a TrafficChannelAssignment message to the mobile handset to request the signal strength measurement. The portable base station may alternatively send an ExtendedChannelAssignment message to the mobile handset to request the signal strength measurement.

DESCRIPTION OF DRAWINGS

FIGS. 3-5 show lists of PN offsets and signal strengths.

DETAILED DESCRIPTION

Figure 1:
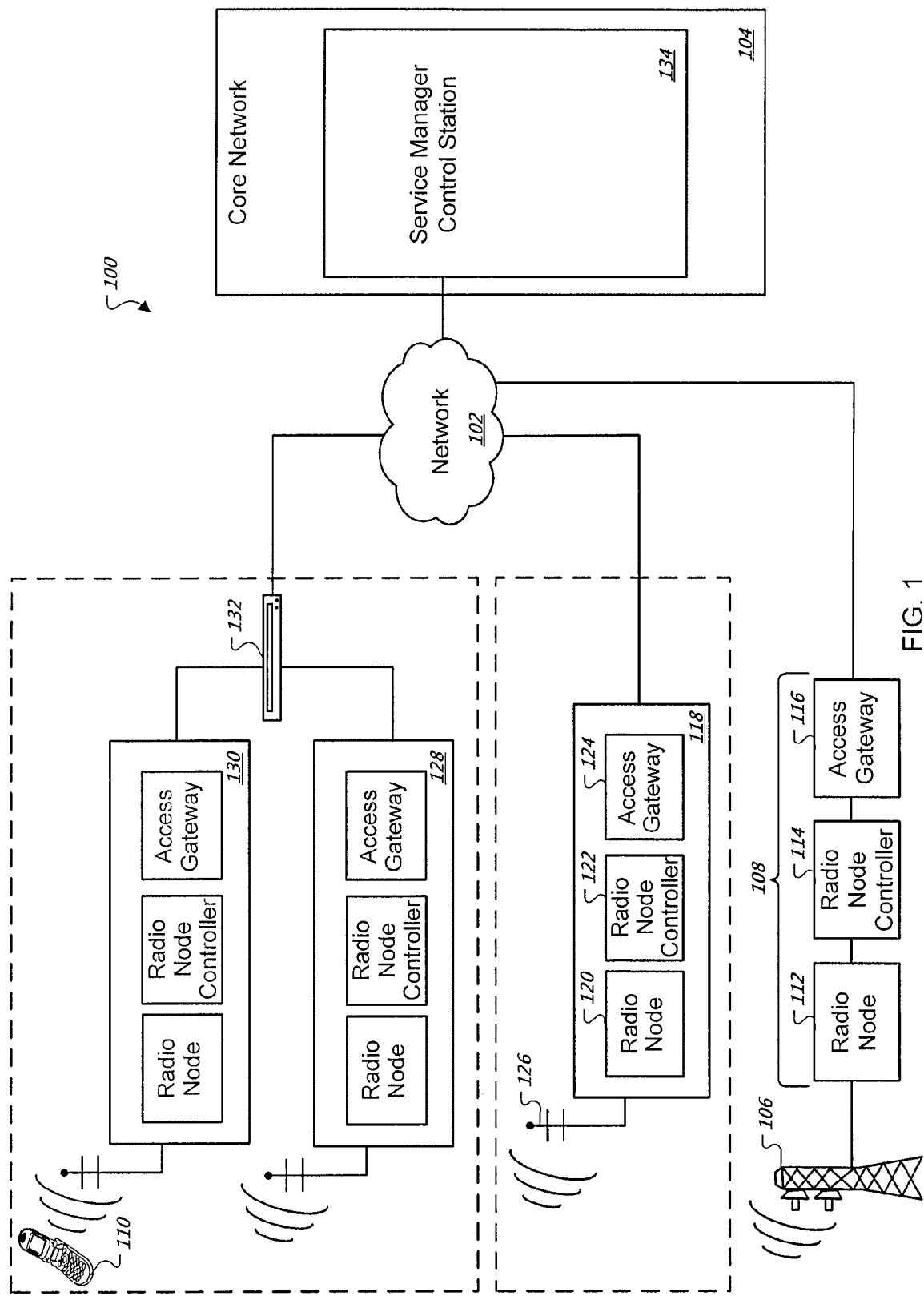
FIG. 1 is a block diagram of a radio access network and a core network.

Referring to FIG. 1, a radio access network (RAN) 100 includes multiple base stations that may bi-directionally communicate through a network 102 (e.g., a base station subsystem (BSS), a mobile switching center (MSC), etc.) with a core network 104 (e.g., a global system for mobile communications (GSM), general packet radio services (GPRS) system, etc.). The RAN 100 includes a conventional antenna tower 106 that is erected at a fixed location and transmits and receives electromagnetic signals that are provided to and from a fixed location base station 108. One or more signaling techniques and standards may be implemented by the fixed location base station 108 to establish communication links (via the antenna tower 106) with one or more mobile handsets such as cellular telephones. For example, techniques and standards associated with the Universal Mobile Telecommunications System (UMTS) may be implemented such that multiple mobile handsets may establish communication links with the fixed location base station 108. Standards associated with spread spectrum air interface protocols such as code division multiple access (CDMA), wideband (W-CDMA), etc. may also be implemented for multiple mobile handsets for establishing communication links.

Other protocols supported may include the 1xEV-DO protocol, which is an evolution of the 1xRTT standard for high-speed data-only (DO) services and has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005, which is also incorporated herein by reference. Revision B to this specification has been initiated as TIA/EIA/IS-856, "CDMA2000 High Rate Packet Data Air Interface Specification," 3GPP2 C.S0024-B, Version 1.0, March 2006 and is also incorporated herein by reference.

To identify itself, the fixed location base station 108 may transmit a signal (via the antenna 106) that uses one or more spread spectrum techniques such as being modulated with a unique pseudorandom code. Thereby, the identification signal may appear as noise, however, the signal may be extracted (e.g., with a correlation process) by an appropriate receiver. By implementing such spread spectrum techniques or orthogonal coding techniques, a mobile handset may distinguish base station identities and the probability of identification signal interference may be reduced. Other types of orthogonal or non-orthogonal coding techniques may also be used to produce unique transmission signals. For example, one or more PN sequences (e.g., gold sequences) referred to as scrambling codes (e.g., for W-CDMA) may be implemented. One or more types of information may also be transmitted to uniquely identify the base station 108 such as transmitting data uniquely assigned to the base station 108.

To provide an identification signal (along with transmitting and receiving other signals), the fixed location base station 108 includes a radio node (RN) 112 that may support one or more wireless standards and protocols (e.g., CDMA, W-CDMA, UMTS, etc.) for communicating with the mobile handsets. Typically the RN 112 includes a transceiver for receiving and transmitting electromagnetic signals and may also include one or more components (e.g., a modulator/demodulator (MODEM)) for modulating a transmission carrier signal to encode digital information for transmission or demodulating a received signal to decode transmitted information. The base station 108 may also include a radio node controller (RNC) 114 that provides commands (and transmission signals) to the RN 112 and receives incoming signals from the RN. The base station 110 may also include an access gateway 116 such as a packet data serving node (PDSN) and may be implemented as a data server to direct data packets to appropriate delivery locations. Additionally the access gateway 116 may provide an interface between networking functions and service levels defined by one or more standards such as the Open Systems Interconnect (OSI) protocol standard as provided by the International Standards Organization (ISO), which is herein incorporated by reference.

Antenna towers such as the antenna tower 106 are erected to typically remain fixed at one location. Prior to erecting the towers, the geographical layout of the towers is planned for providing appropriate wireless coverage. Additionally, each tower is assigned a portion of a code space so that the antenna (and the corresponding fixed location base station) may uniquely identify itself to the one or more mobile handsets within the coverage area. Since mobile handsets such as a mobile handset 110 may communicate with base stations (e.g., CDMA, W-CDMA and UMTS base stations) with equivalent frequencies, the mobile handset needs to differentiate one fixed location base station from another. In order to identify each fixed location base station separately, each base station may repeatedly transmit a sequence of pseudorandom numbers (PN) that is offset from PN sequences being transmitted by the other base stations. The PN offset is assigned to each fixed location base station respectively connected to an antenna erected at a fixed location. Typically these offset assignments are determined prior to the antenna tower becoming operational and the offsets are permanently assigned once the tower is in operation. However, such a manual offset assignment process is often time-consuming and expensive since the assignments need to be completed before tower erection. Typically, an equivalent PN sequence is transmitted from each fixed antenna; however, in some scenarios different PN-sequences may be transmitted to uniquely identify base stations. Furthermore, along with transmitting the signals on an equivalent frequency, different frequencies may be used for signal transmission.

The RAN 100 also includes a portable base station 118 that is in communication with the core network 104 and provides the functionality of the fixed location base station 108 along with being portable. For example, the portable base station 118 may include an RN 120, an RNC 122 and an access gateway 124 (e.g., a PSDN). The portable base station 118 is connected to a portable antenna 126 that is capable of establishing links with one or more mobile handsets. The characteristics of the portable antenna 126 (e.g., beam pattern, gain, etc.) may be selected for establishing links to mobile handsets located relatively close to the portable base station 118. Furthermore, design characteristics (e.g., component size, power consumption, etc.) of the RN 120, RNC 122 and the access gateway 124 may be selected for portability. As such, the portable base station 118 may provide less wireless coverage area than the fixed location base station 108 (e.g., coverage to service a single residential home, a portion of a multiple residence building or other structure or location of similar size and area). However, due to its mobility, the portable base station 118 may interfere with the operations of the fixed location base station 108 or other relatively closely located base stations (e.g., other portable base stations, fixed location base stations, etc.). For example, identification signals transmitted by the portable base station 118 may interfere with base stations using near-by or equivalent code space (e.g., PN offset, PN sequence, etc.). Since the code space usage in the area that a portable base station operates is not known a priori, the PN offset used by the portable base station is typically configured adaptively at power up. The PN offset assignment may be periodically updated thereafter to adapt to changes in the environment, such as the arrival of additional portable base stations in the area.

Along with using a single portable base station to provide coverage to one location, multiple portable base stations may be implemented. For example, a portable base station 128 and a portable base station 130 are located nearby and are connected to the network 102 through a router 132. Use of multiple portable base stations may allow, for example, access interfaces for mobile handsets within a campus area (e.g., university, medical, or government facility, housing development, etc.) or other types of locations. The number of PN offsets available is limited. When many portable base stations operate within the coverage area of the same fixed base station, the need for PN offset reuse may arise. The interference caused by sharing PN offsets within an area can be mitigated by allocating the PN offsets in a manner that ensures portable base stations assigned to the same PN offset are relatively distant from each other.

Along with sending and receiving content (e.g., audio, video, data packets, etc.) to and from the fixed location base station 108 and the portable base stations 118, 128, 130, the core network 104 may exchange data and signals with other components included in or in communication with the RAN 100. For example, data may be sent to other base stations, conventional landline telephone systems (e.g., Plain Old Telephone Service (POTS) systems, etc.) or other similar delivery sites and sources.

In the exemplary RAN 100, a service manager control station 134 (via communication with the core network 104) dynamically allocates code space (e.g., one or more PN sequences) and assigns portions of the code space (e.g., PN offsets, PN sequences, etc.) to each of the portable base stations 118, 128, 130 (and optionally, the fixed location base station 108). Location tracking, PN offset assignment storage, and other functions may also be provided by the control station 134 such as tracking the location of the base stations (e.g., portable base stations, fixed location base stations). In one arrangement, the control station 134 assigns an appropriate PN offset to a portable base station based upon the strength of signals (with PN offsets) in the vicinity of the portable base station. For example, a PN offset may be assigned that corresponds to a relatively weak signal (that includes the PN offset) or an offset that is not observed to be associated with any signals in the vicinity of the portable base station. One or more techniques and methodologies may be implemented for measuring signal strength. For example, the portable base station may request a mobile handset (in communication with the base station) to measure the strength of signals in the vicinity. Along with storing data representing available PN offsets, the service manager control station 134 may also store PN offset assignments along with other information (e.g., base station location information, base station capabilities, assignment confirmations, etc.). To exchange information with the base stations, one or more techniques may be implemented by the service manager control station 134. For example, encryption techniques may be implemented to reduce the probability of interception or modification of PN offset assignments.

In some implementations, a portable base station may be initialized (e.g., upon power-up) with a default PN offset, for example, by a setting or group of settings entered by a manufacturer or other entity. Other information may also be used for setting a default, for example, a portable base station may select a default PN offset based upon the region (e.g., time zone, GPS coordinates, etc.) in which the base station is located upon activation. In some implementations, a portable base station may request an initial PN offset by using one or more techniques such as transmitting a signal, an electronic message, a file, a data structure, or another similar methodology. For example, a portable base station may request a default PN offset from the service manager control station 134 upon becoming operational (e.g., powered up) and establishing communication with the core network 104.

PN offset (or PN sequence) assignments may be initiated by a predefined (or undefined) event such as the portable base station 130 being powered up, establishing a communication link with the core network 104, and establishing a connection with a mobile handset (e.g., the mobile handset 110). The portable base station 130 may request that the mobile handset 110 measure the strength of detectable signals associated with base stations in the vicinity. Once the mobile handset 110 has reported the signal strengths and associated PN offsets to the portable base station 130, a message may be sent by the portable base station 130 to the service manager control station 134 to request a PN offset assignment. Such messages may include information regarding the PN offsets and associated signal strengths of the nearby base stations along with mobile handset and base station information. The service manager control station 134 may use the PN offsets provided by the message received from the portable base station 130 (e.g., the weakest PN offset signal within range of the mobile handset 110) or assign a PN offset associated with signal not detected by the mobile handset (or currently not assigned to a base station). In a similar manner the other portable base stations 118, 128 may request a PN offset (or other type of code space portion) upon becoming operational. In addition to becoming operational, events that initiate a PN offset request may include the occurrence of predefined time (e.g., midnight each evening), resetting the portable base station, user initiated, or other type of similar event.

In some implementations, the PN offset assignment request sent to the service manager control station 134 may contain information such as data that identifies the base station (e.g., a unique alphanumerical identifier assigned to the base station by a manufacturer, etc.), the location of the portable base station (e.g., GPS coordinates), base station capabilities (e.g., coverage area, transmission power, etc.), status information (e.g., number of established mobile handset links) and other types of information. For example, GPS coordinates may be inserted into the message from a GPS receiver (not shown) that is included in the base station. Location information may also be provided from an external source such as an external GPS receiver or other type of location determining device in communication with the base station. Data that represents a previously used PN offset (or other type of code space portion) may also be included in the message. Information such as location information may be provided to a portable base station from a user interface (e.g., a keyboard) or a data conduit (e.g., communication port) from another device (e.g., a GPS receiver). Other included information may be used for security (e.g., a public key, etc.), data compression, or other types of functions.

In some implementations, a PN offset monitoring element within or attached to the portable base station may execute operations for providing the portable base station 130 with a default PN offset. For example, the PN offset monitoring element may initiate signal collection in the vicinity of the base station for identifying the PN offset associated with the weakest signal (or determining the absence of a signal with a particular PN offset). Upon identification, the PN offset monitoring element may notify the service manager control station 134 of the PN offset for assignment initiation. The PN offset monitoring element may instead select a PN offset as a default which the portable base station may initially broadcast.

In other implementations, the portable base stations 118, 128, 130 may communicate via a local area network (LAN) connecting to an internet protocol (IP) core network to obtain a default PN offset and/or a PN offset assignment. For example, the portable base station 128 could connect to the IP core network via a wireless modem to a wireless LAN (WLAN) to communicate with a service manager control station. In another example, the portable base station 128 could be in communication with a computer device 132 which have Internet and/or intranet connectivity (e.g., via cable modem, wireless modem, etc.). While obtaining a PN offset assignment via an IP core network, the portable base stations 118, 128, 132 may also communicate with mobile devices within the RAN 100. Other network communication schemes are possible.

Figure 2:
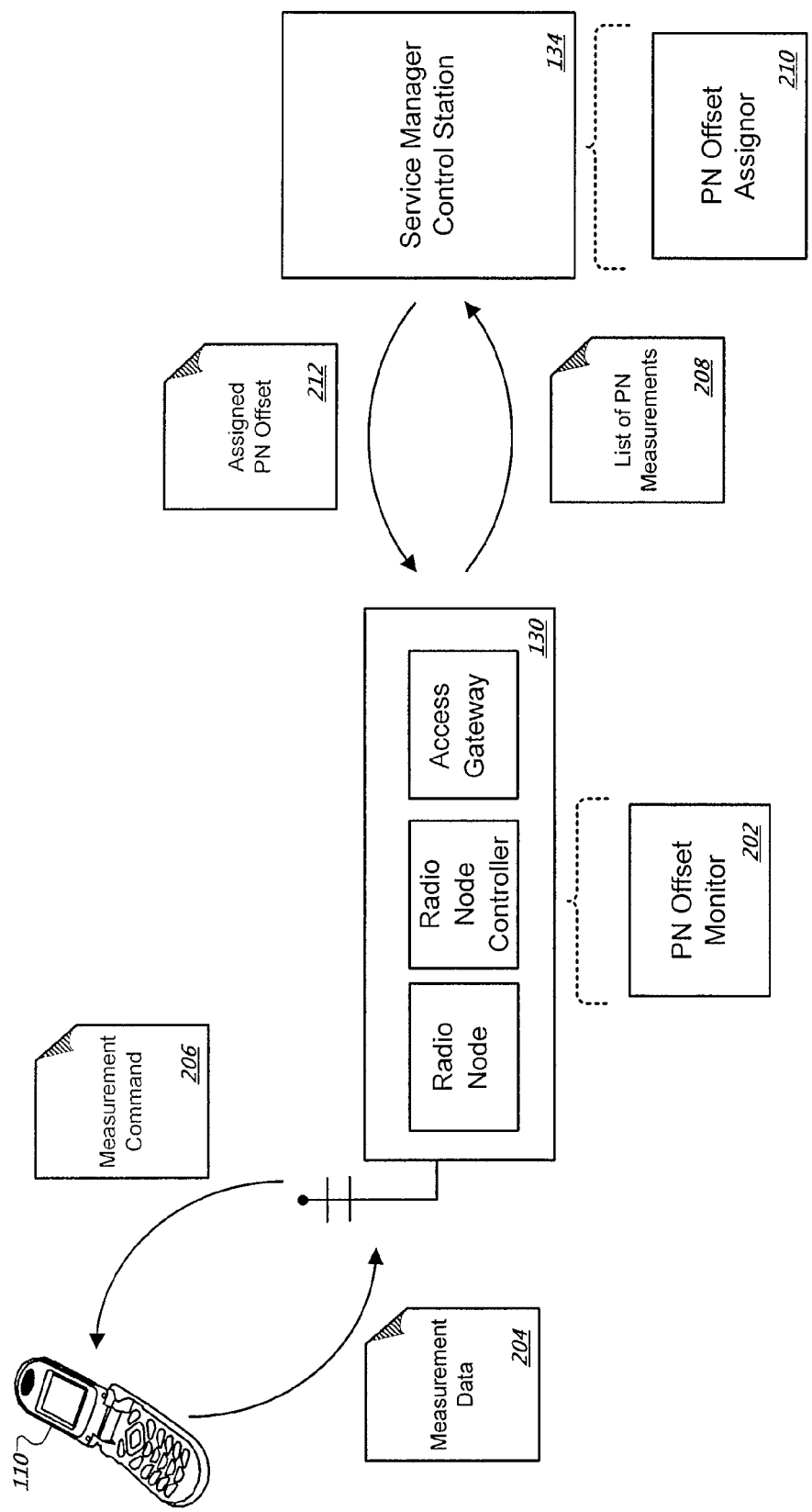
FIG. 2 illustrates information exchanging among a mobile handset, a portable base station and a service manager.

Referring to FIG. 2, operations of the portable base station 130 are illustrated for obtaining a PN offset assignment from the service manager control station 134 using signal measurement information provided by the mobile handset 110. Upon becoming operational, the portable base station 130 may broadcast a signal that includes a PN sequence with a default PN offset (e.g., assigned by the base station manufacturer) for self-identification and for establishing communication links with mobile handsets. Upon being instructed by the portable base station 130, the mobile handset 110 may implement one or more techniques for measuring base station signal emissions.

One or more types of measurement commands 206 may be issued by the portable base station 130 to initiate signal strength measurements by the mobile handset 110. For example, the measurement command 206 may depend upon the protocol being used to communicate between the portable base station 130 and the mobile handset 110. For RANs using the EV-DO protocol, a message such as the TrafficChannelAssignment message may be sent, while a message such as the ExtendedChannelAssignment message may be sent for arrangements in which the RAN uses the 1XRTT protocol. Messages that comply with the GSM and UMTS standards may also be used as measurement triggers. Such commands instruct the mobile handset 110 to measure the strength of signals associated with base stations which are in active connection with the mobile handset (referred to as active base stations) and/or base stations which are in a state capable of establishing a connection with a mobile handset (referred to as candidate base stations). For example, the base station that the mobile handset 110 is presently connected to (e.g., the portable base station 130) may be considered an active base station.

Along with initiating measurements by the mobile handset 110, the measurement command 206 may contain additional information such as a list of PN offsets for which the mobile handset 110 is to obtain a signal strength measurement. In some arrangements the PN offsets included in the list may be associated, for example, with the geographic location of the base stations. Such base station geographic information may be provided by one or more techniques such as factory presets, user provided information and setting, base station functionality (e.g., a built-in GPS receiver), etc. If a subset of the PN offset range is significant to a particular geographic region, the mobile handset 110 can be instructed to search for the geographic subset of the full list of PN offsets. In some implementations, the list may include a range of PN offsets based upon previous code space allocations, communication standard compliance (e.g., PN offsets available based on the CDMA specification, etc) and other methodologies. For example, 512 total PN offsets may be available within the CDMA specification. In some implementations, the measurement command 206 initiates placing PN offsets into an active and/or candidate base station status within the mobile handset 110. Through promoting PN offsets to the active and/or candidate status, the mobile handset 110 may begin to actively monitor those PN offsets for signal strength.

The measurement command 206 may also contain other information, for example, a time delay or time-out value may be included to identify a measurement period. Upon expiration of the measurement period, undetected signals associated with particular PN offsets may cause the PN offsets to be registered as unused in the vicinity. Commands providing such functionality include the PilotDropTimer command for CDMA systems.

The mobile handset 110 may respond to the portable base station 130 with measurement data 204, including signal strengths associated with the PN offsets which were requested within the measurement command 206. Such messages may be associated with one or more protocols and standards. For example, a RouteUpdate message (EV-DO) or PilotStrengthMeasurement message (cdma2000-1X) may contain the signal strength measurements related to base stations within range of the mobile handset 110 which are candidates for connection along with the signal strength of the active base station. Messages associated with other standards may be implemented. In some implementations, the mobile handset 110 sends a response when all of the PN offsets listed within the measurement command 206 have been detected by the mobile handset 110. The mobile handset 110 may send the measurement data 204, in some implementations, after a set period of time has passed. For example, if a drop timer expires before one or more PN offsets have issued a response, no signal strength is provided within the measurement data for those PN offsets.

In some implementations, the measurement data message 204 may only provide measurements for a set number of PN offsets. Measurement commands such as the measurement command 206 may be provided in a repetitive manner to request signal strength measurements for a greater number of PN offsets. For example, in some implementations, the measurement command 206 may provide a first set of PN offsets that are a subset of the total number of PN offsets of which corresponding signal strengths are to be measured. Subsequent measurement commands may be sent that include other PN offset subsets until measurements have been completed for the total number of PN offsets. A series of measurement commands such as the measurement command 206 may be sent periodically for measuring corresponding signal strengths in cycles. The measurement command 206, in some implementations, may be issued by the PN offset monitor 202.

The portable base station 130 may accumulate the PN offsets and associated signal strength measurements received within repetitive transmissions of measurement data 204. In some implementations, the PN offset monitor 202 may store the signal strength data in a memory (not shown) (e.g., random access memory (RAM), static RAM (SRAM), etc.) or a storage device (also not shown) included in the portable base station 130 or accessible by the portable base station 130 (e.g., via the network 102). The portable base station 130 may continue to issue measurement commands 206 and receive measurement data 204, in some implementations, until the mobile handset 110 has responded with signal strength information associated with all desired PN offsets.

After the portable base station 130 has received the desired PN offset measurements within one or more transmissions of measurement data 204, the portable base station 130 may send a list of PN measurements 208 to the service manager control station 134 so that the service manager control station 134 may assign a PN offset to the portable base station 130. The list of PN measurements 208, in some implementations, contains a list of all PN offsets requested within the measurement command 206 along with the signal strength associated with each PN offset as measured by the mobile handset 110. In other implementations, the list of PN measurements 208 only contains the PN offsets associated with the weakest signal strengths as measured by the mobile handset 110 (e.g., all unresponsive PN offsets, all PN offset measurements below a particular decibel threshold, etc.). In addition to a list of PN offsets and signal strength measurements, the list of PN measurements 208 may contain information regarding the portable base station 130 (e.g., identification information, location, broadcast signal strength, etc.). In some implementations, the list of PN measurements 208 is sent in a secure manner (e.g., encrypted).

To process the list of PN measurements 208, in some implementations, a PN offset assignor 210 may be executed by the service manager control station 134 to identify the appropriate PN offset (if any) to assign to the portable base station 130. In some implementations, the PN offset assignor may select from the list of PN measurements 208 the PN offset associated with the weakest signal strength and assign it to the portable base station 130. The PN offset assignor 210, in some implementations, may select a PN offset from those associated with the weakest signal strengths, taking into consideration the PN offsets presently and/or previously allocated to other portable base stations within the region. The PN offset assignor 210 may also consider, in some implementations, assigning a PN offset which is adequately distanced from the strongest PN offsets within the list of PN measurements 208. For example, the PN offset assignor 210 may select a PN offset such that the difference between neighboring offsets is large enough to avoid potential conflicts due to mistaken communications. In some implementations, the PN offset assignor 210 may store the PN offset assignment associated with the portable base station 130 within a memory (not shown) (e.g., random access memory (RAM), static RAM (SRAM), etc.) or a storage device (also not shown) included in the service manager control station 134 or accessible by the service manager control station 134 (e.g., via the core network 104).

Upon determining a PN offset assignment for the portable base station 130, a PN offset assignment message 212 may be sent from the service manager control station 134 to the portable base station 130. In some implementations, the PN offset allocated within the PN offset assignment message 212 may be stored by the PN offset monitor 202 within the portable base station 130. Once the portable base station 130 has received the PN offset assignment 212, the portable base station 130 can begin to broadcast the assigned PN offset. In some implementations, the idle connection with the mobile handset 110 may disconnect due to the portable base station 130 beginning to broadcast the new PN offset. The mobile handset 110 may reconnect using the issued PN offset. In some implementations, if the portable base station 130 is connected to active sessions with one or more mobile handsets, the portable base station 130 may continue to broadcast the previously used PN offset until those sessions have ended.

In some implementations, the PN offset assignment message 212 may alert the portable base station 130 that no PN offset has been assigned. For example, if the list of PN measurements 208 did not contain information validating the portable base station 130 with the service manager control station 134, the PN offset assignor 210 may respond with a failure to allocate a PN offset. In another example, there may be no PN offset available to assign to the portable base station 130. In some implementations, the PN offset assignor 210 may include a request for additional information within the offset assignment message 212.

In some implementations, the portable base station 130 may reissue the measurement command 206 at a later point in time. For example, the signal strengths obtained within the measurement data 204 may be based upon the mobile handset 110 being situated within a certain position in relation to the portable base station 130. The measurement data 204, therefore, may not be indicative of the average signal strengths observed by any mobile handset within the broadcasting vicinity of the portable base station 130 wishing to obtain an active session with the portable base station 130. PN offsets may have been allocated or revoked, in another example; from the signaling region of the portable base station 130 since the portable base station 130 last issued the measurement command 206. For example, the regional PN offset allocations may change as portable base stations activate and/or deactivate. In some implementations, the portable base station 130 may reissue the measurement command 206 because the portable base station 130 has been relocated. For example, the portable base station 130 may include a GPS system to track its present location.

The portable base station 130 may reissue the measurement command 206, in some implementations, based upon a set schedule (e.g., hourly, daily, every tenth mobile handset to connect to the portable base station 130, etc.). In some implementations, the portable base station 130 may wait to reissue the measurement command 206 until a point of time at which the portable base station 130 is not carrying an active session with a mobile handset. The reissue of the measurement command 206, in some implementations, may occur upon powering up the portable base station 130. In some implementations, the portable base station 130 may send the list of PN measurements 208 upon request by the service manager control station 134.

Depending upon the message type used in the measurement command 206, other parameters may be set by the base station 130. In some arrangements, the portable base station 130 may suggest an offset range for the mobile handset 110 to use in measuring signal strengths associated with the base stations within the vicinity. For example, the SearchWindowActive command can be used within the CDMA messaging format to specify a PN offset range to apply to the search.

Figure 3:
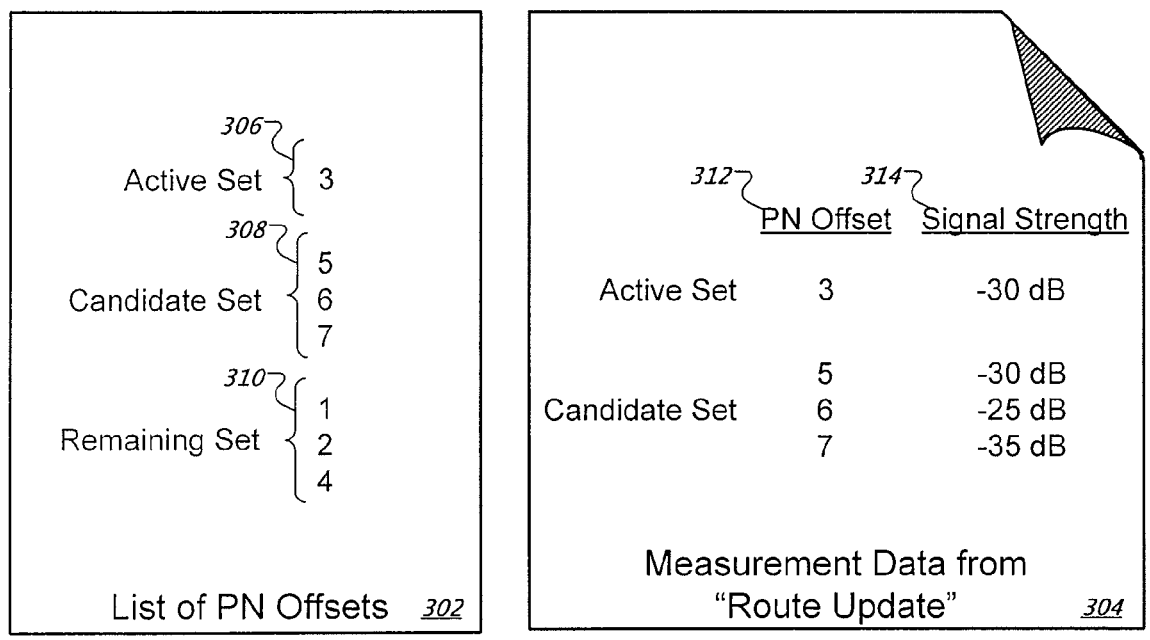

Referring to FIG. 3, a list of PN offsets 302 and a table of measurement data 304 illustrate information which may have been collected by a mobile handset on behalf of a portable base station. Any number of PN offsets may be included within the list of PN offsets 302. The list of PN offsets 302 includes an active set 306 (offset=3), which contains the PN offset associated with an active session with a mobile handset. In some implementations, the active PN offset may be a default PN offset used by a portable base station. The mobile handset, for example, may have initiated communications based upon the mobile handset detecting a strong signal strength transmitted from the base station associated with that PN offset.

The mobile handset, in some implementations, may have the option of beginning an active session with the base stations associated with the PN offsets listed within a candidate set 308 (offset=5, 6 and 7). The PN offsets included within the candidate set 308, in some implementations, may be associated with signal strengths measured by the mobile handset as being substantially equivalent or slightly lower than the signal strength associated with the PN offset listed within the active set 306. For example, the mobile handset may attempt to open a communications session with the base station that is broadcasting the PN offset that the mobile handset measures as associated with the strongest signal strength in the vicinity. Due to the mobility of the mobile handset, during a communication session the signal strength of the PN offset within the active set 306, as detected by the mobile handset 110, may weaken. The mobile handset, in some implementations, periodically calculates the signal strengths of the PN offsets within the candidate set 308 to determine which base station to switch to when the signal strength of the PN offset within the active set 306 becomes too weak.

A remaining set 310 (offset=1, 2 and 4) may contain the weakest signal strengths that the mobile handset may detect. In some implementations, the mobile handset may only periodically track the active set 306 and the candidate set 308. For example, the remaining set 310 may contain a list of PN offsets which a portable base station requests the mobile handset attempt to locate to calculate the signal strength. In this example, the remaining set 310 may become a candidate set of PN offsets eligible for the portable base station to use for communicating with mobile handsets. In some implementations, the portable base station may use a subset of PN offsets known to be allocated for use within the present geographical region when generating the remaining set 310. In other implementations, all remaining PN offsets (e.g., tip to 512) may be included within the remaining set 310.

In other implementations, the mobile handset may measure the signal strengths for the remaining set 310 of PN offsets less frequently than the signal strengths of the active and candidate sets 306, 308. In some implementations, the PN offsets contained within the candidate set 308 and the remaining set 310 may fluctuate based upon the most recent signal strength measurements. For example, a PN offset within the remaining set 310 (offset=1, 2, or 4) may be promoted to the candidate set 308 when the measured signal strength increases, or a PN offset within the candidate set 308 (offset=5, 6, or 7) may be demoted to the remaining set 310 when the measured signal strength weakens.

In some implementations, when the mobile handset connects to the base station associated with the PN offset listed within the active set 306, the mobile handset may automatically send the measurement data message 204 (e.g., RouteUpdate) to the base station. A table of measurement data 304 in the measurement data message 204 contains a set of PN offsets 312 and a set of associated signal strengths 314. The signal strengths 314 may refer to the strength of signals, e.g. in decibels (dB), as measured by the mobile handset. The set of PN offsets 312 includes the PN offsets contained within the active set 306 (offset=3) and the candidate set 308 (offset=5, 6 and 7) found within the list of PN offsets 302. For example, the active PN offset 314 (offset=3) is associated with a signal strength 314 of −30 dB. Similarly, the candidate PN offsets 312 (offset=5, 6 and 7) are associated with the signal strengths 314 {−30 dB, −25 dB, and −35 dB}, respectively.

Figure 4:
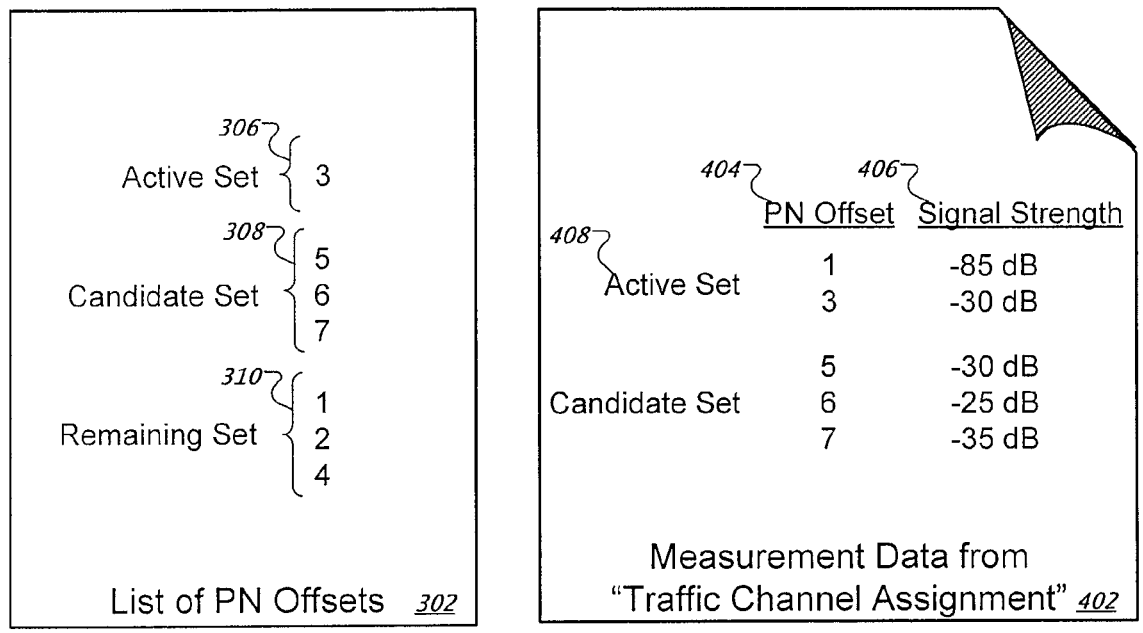

Referring to FIG. 4, a table of measurement data 402 contains a set of PN offsets 404 and associated signal strengths 406. In some implementations, the measurement data 402 may be sent to the portable base station in response to a request for signal measurement (e.g., a TrafficChannelAssignment message). Within an active set of PN offsets 408 (offset=1, 3), the PN offset of 1 has been promoted to the active set alongside the PN offset 3 from the initial active set 306. In some implementations, the signal measurement request (e.g., measurement command 206) may initiate PN offsets to be promoted from the remaining set 310 (offset=1, 2 and 4) and/or the candidate set 308 (offset=5, 6 and 7) to the active set 408. The promotion of PN offsets to the active set 408, for example, may force the mobile handset to measure signal strength for those PN offsets (e.g., offsets formerly listed within the remaining set 310). Various number of PN offsets may be promoted into the active set 408. For example, using the TrafficChannelAssignment message, the portable base station may promote from one to five PN offsets to the active set 408. In some implementations, the active set 408 may continue to contain the PN offset of the base station that is in active communication with the mobile handset (e.g., PN offset 3). In this illustration, the promoted PN offset (e.g., PN offset 1), is associated with a signal strength 406 of −85 dB.

Referring to FIG. 5, a table of signal strength measurements 502 contains a list of PN offsets 504 (offset=4, 2, 1, 3, 5, 6 and 7) and associated signal strengths 506 (i.e., −77 dB, −75 dB, −85 dB, −30 dB, −20 dB, −25 dB and −35 dB). The table 502 may have been collected, for example, by a portable base station issuing TrafficChannelAssignment commands to a mobile handset. In some implementations, the table of signal strength measurements 502 can be used to allocate a PN offset to a portable base station. For example, the table of signal strength measurements 502 could be sent within the list of PN measurements 208 (shown in FIG. 2) to the service manager control station 134. The list of PN offsets 504 includes the PN offsets comprising the active set 306 (offset=1), the candidate set 308 (offset=5, 6, 7), and the remaining set 310 (offset=1, 2, 4) of the list of PN offsets 302 (shown in FIG. 3). In some implementations, rather than a decibel measurement, a signal strength designating an unreachable PN offset may be listed within the signal strengths 506.

Figure 6:
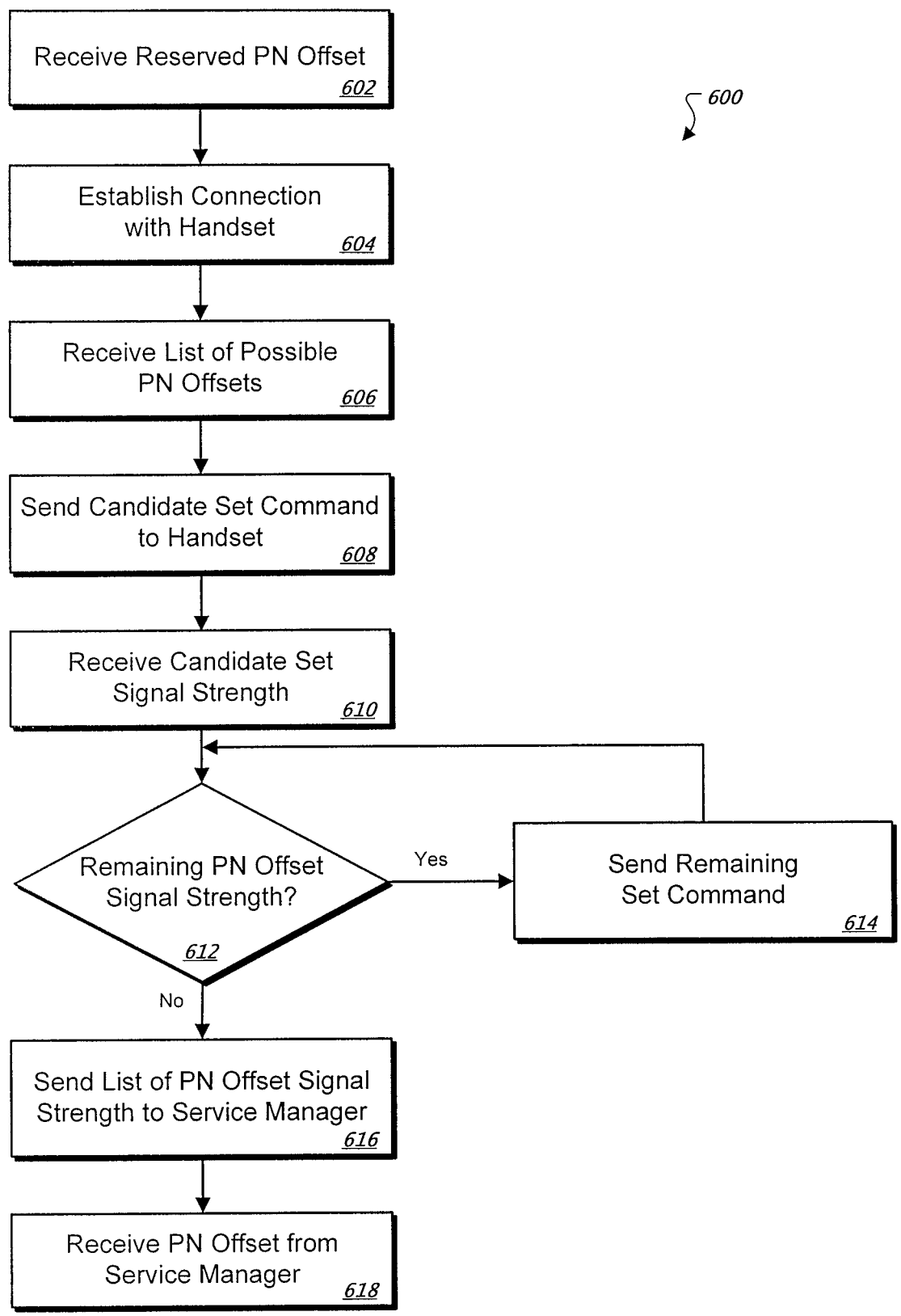
FIG. 6 is a flow chart of some operations of a PN offset monitor.

Referring to FIG. 6, a flow chart 600 represents operations in which a portable base station (e.g., portable base station 130 shown in FIG. 1) negotiates to receive a PN offset assignment from a service manager (e.g., service manager control station 134 shown in FIG. 1). Some operations may be executed by the PN offset monitor 202 (shown in FIG. 2). When a portable base station first begins broadcasting, it may be located within the broadcasting region of other fixed location and/or portable base stations. To uniquely identify itself in relation to these other base stations, the portable base station may broadcast a PN sequence at a unique PN offset. Upon powering up and/or connecting to the local network (e.g., RAN 100 shown in FIG. 1), the portable base station may first determine a PN offset which it can broadcast without interfering with other nearby PN signals. Operations of the portable base station include receiving 602 a reserved PN offset. In some implementations, one or more reserve PN offsets may be coded into the portable base station by the manufacturer. For example, a different reserve PN offset may be used depending upon the geographic region the portable base station is broadcasting in. The portable base station may recognize its region, for example, by using a built-in or connected GPS device or through a user setting (e.g., start-up setting).

Using the reserve PN offset, the portable base station may begin broadcasting within the network (e.g., RAN). A mobile handset within the broadcast area of the portable base station may recognize the signal. Operations include establishing 604 a connection with the mobile handset. In some implementations, the mobile handset may enter into an idle session with the portable base station. The operations of the portable base station include receiving 606 a list of possible PN offsets from the mobile handset. In some implementations, the mobile handset may automatically send a list of PN offsets to the portable base station upon connection to the portable base station. For example, a measurement data message 204 (e.g., RouteUpdate) from the mobile handset may include a list of active and/or candidate PN offsets within the region of the mobile handset along with signal strengths associated with each PN offset.

The list of PN offsets received by the portable base station may not include all of the PN offsets within the receiving range of the mobile handset. For example, the mobile handset may only monitor a subset of the PN offsets associated with base stations which are broadcasting a strong enough signal to be considered as potential connection points for the mobile handset. Operations include sending 608 a measurement command to the mobile handset including a request for signal strength information for a list of candidate PN offsets. In some implementations, the list of candidate PN offsets may be geographically significant. For example, only a subset of the total potential PN offset values (e.g., 512) may be valid within a particular geographic region. In some implementations, a set number of candidate PN offsets may be requested within a measurement command. For example, a list of up to five candidate PN offsets in addition to the active PN offset (e.g., the reserve PN offset being broadcast by the portable base station) may be promoted to the active PN offset set within a TrafficChannelAssignment message. Included within the measurement command may be a time-out value setting an amount of time to wait for a response from the candidate PN offsets and/or other information.

Promotion to the active PN offset set may cause the mobile handset to calculate signal strength measurements for the candidate PN offsets. Once the mobile handset has gathered signal strength measurements for the set of candidate PN offsets, the mobile handset may forward the signal strength measurements to the portable base station within a set of measurement data. Operations include receiving 610 a list of signal strengths associated with the candidate set of PN offsets from the mobile handset. In some implementations, the portable base station may receive the measurement data within a RouteUpdate message from the mobile handset. In some implementations, the signal strengths are reported in decibel format. The PN offset monitor 202, in some implementations, may store the signal strength data received.

Operations of the portable base station may include determining 612 whether or not there are remaining PN offsets. For example, a total of forty PN offset measurements may potentially be in use within the geographic region of the portable base station. If the portable base station is using the TrafficChannelAssignment message to request up to five PN offset measurements at a time, multiple measurement commands may be issued to receive information regarding the entire set of PN offsets desired. If the portable base station requires signal strength measurements for one or more remaining PN offsets, operations of the portable base station may include sending 614 a request for the signal strengths of the remaining set of PN offsets within one or more additional commands. For example, the portable base station may continue to issue measurement commands until all desired PN offsets have been measured.

If no additional PN offsets remain, operations of the portable base station may include sending 616 a list of PN offsets and associated signal strengths to the service manager. In some implementations, the PN offset monitor 202 may compile a list of PN offsets and their associated signal strengths as received by one or more responses to measurement commands issued to the mobile handset by the portable base station. The list of PN offsets, in some implementations, may include only the weakest PN offset signal strengths as calculated by the mobile handset. For example, the list of PN offsets may include the PN offsets which were unreachable and/or the PN offsets which are associated with a signal strength below a particular threshold. In some implementations, the portable base station may include additional information within the message to the service manager (e.g., portable base station identification, the broadcast range of the portable base station, the GPS coordinates of the portable base station, etc.).

The service manager may use the list of PN offsets and signal strengths to assign a PN offset to the portable base station. Operations of the portable base station may further include receiving 618 a PN offset assignment from the service manager. In some implementations, the portable base station may begin to broadcast the assigned PN offset. The service manager, in some implementations, may respond with a failure to assign a PN offset. For example, the service manager may not recognize identification information sent from the portable base station.

In some implementations, the portable base station may periodically update the PN offset assignment. For example, if the portable base station is moved to a new location, it may request a new PN offset assignment. In some implementations, the portable base station may not immediately begin broadcasting the PN offset assigned by the service manager. For example, changing to a new PN offset may cause the portable base station to disconnect any active sessions with mobile handsets. The portable base station may wait until there are no active sessions with mobile handsets to begin using the assigned PN offset.

Although the techniques described above employ the EV-DO air interface standard, the techniques are also applicable to other CDMA and non-CDMA air interface technologies in which an access terminal communicates with a server over a network.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The techniques described herein can be performed in a different order and still achieve desirable results

What is claimed is:

1. A method comprising:
a portable base station, requesting a mobile handset to measure signal strengths associated with an identified portion of a code space; and
sending a message that represents the signal strength measurements to a remotely located control station.

2. The method of claim 1, further comprising:
selecting a portion of the code space for use by the portable base station, based at least in part upon the measurements of signal strength.

3. The method of claim 1, in which requesting the signal strength measurement includes identifying a portion of code space in which to measure signal strength.

4. The method of claim 1, in which the identified portion of code space is selected based upon the geographic location of the portable base station.

5. The method of claim 1, in which the code space includes one or more sequences of pseudorandom numbers and associated timing offsets.

6. The method of claim 1, further comprising:
receiving a message at the portable base station that identifies a portion of code space assigned to the portable base station from the control station.

7. An apparatus comprising:
a portable base station configured to request a mobile handset to measure signal strengths associated with an identified portion of a code space and send a message that represents the signal strength measurements to a remotely located control station.

8. The apparatus of claim 7 in which the portable base station is further configured to:
select a portion of the code space for use by the portable base station, based at least in part upon the measurements of signal strength.

9. The apparatus of claim 7 in which the portable base station is further configured to:
identify a portion of code space in which to request measurements of signal strength.

10. The apparatus of claim 7 in which the identified portion of code space is selected based upon the geographic location of the portable base station.

11. The apparatus of claim 7 in which:
the code space includes one or more sequences of pseudorandom numbers and associated timing offsets.

12. The apparatus of claim 7 in which the portable base station is further configured to:
receive a message that identifies a portion of code space assigned to the portable base station from the control station.

13. A system, comprising:
a portable base station configured to request a mobile handset to measure signal strength associated with identified elements of a code space and further configured to send a message that represents received signal strength measurements; and
a control station configured to assign a portion of the code space to the portable base station based in part upon said signal strength measurements.

14. The system of claim 13, wherein the portable base station is further configured to:
select, based at least in part upon geographic location of the portable base station, a portion of code space in which to request measurements of signal strength.

15. The system of claim 13, wherein the code space includes one or more sequences of pseudorandom numbers and associated timing offsets.

16. The system of claim 13, wherein the portable base station calculates a weighted average of signal strength measurements from multiple mobile handsets for one or more code space elements.

17. A computer readable storage device storing instructions that are executable by a processing device, and upon such execution causing the processing device to:
send a request to measure signal strengths associated with an identified portion of a code space from a portable base station to a mobile handset; and
send a message that represents the signal strength measurements to a remotely located control station from the portable base station.

18. The storage device of claim 17 in which the instructions cause the processing device to:
select a portion of the code space for use by the portable base station, based at least in part upon the measurements of signal strength.

19. The storage device of claim 17 in which the instructions cause the processing device to:
identify a portion of code space in which to measure signal strength.

20. The storage device of claim 17 in which the identified portion of code space is selected based upon the geographic location of the portable base station.

21. The storage device of claim 17 in which the code space includes one or more sequences of pseudorandom numbers and associated timing offsets.

22. The storage device of claim 17 in which the instructions cause the processing device to:
receive a message at the portable base station that identifies a portion of code space assigned to the portable base station from the control station.

23. An apparatus comprising:
a portable antenna configured to transmit and receive electromagnetic signals;
a portable base station connected to the portable antenna and comprising:
a radio node configured to control the portable antenna and to comply with at least one wireless communication protocol;
a radio node controller configured to provide transmission signals to the radio node and receive signals from the radio node to establish a connection between the portable base station and a mobile handset, the radio node controller is also configured to request the mobile handset measure signal strength associated with an identified portion of a code space; and
an access gateway for exchanging data packets with a network, wherein the access gateway is configured to send a message that represents the measured signal strength to a remotely located control station.

24. The apparatus of claim 23 in which the portable base station sends a TrafficChannelAssignment message to the mobile handset to request the signal strength measurement.

25. The apparatus of claim 23 in which the portable base station sends an ExtendedChannelAssignment message to the mobile handset to request the signal strength measurement.

* * * * *